US009609325B2

(12) United States Patent
Oh et al.

(10) Patent No.: US 9,609,325 B2
(45) Date of Patent: *Mar. 28, 2017

(54) APPARATUS FOR DECODING AN IMAGE

(71) Applicant: M & K HOLDINGS INC, Seoul (KR)

(72) Inventors: Soo Mi Oh, Gyeonggi-Do (KR);
Moonock Yang, Singapore (SG)

(73) Assignee: M & K HOLDINGS INC., Seoul (KR)

( * ) Notice: Subject to any disclaimer, the term of this patent is extended or adjusted under 35 U.S.C. 154(b) by 92 days.

This patent is subject to a terminal disclaimer.

(21) Appl. No.: 14/929,516

(22) Filed: Nov. 2, 2015

(65) Prior Publication Data

US 2016/0057421 A1   Feb. 25, 2016

Related U.S. Application Data

(63) Continuation of application No. 13/624,852, filed on Sep. 21, 2012, which is a continuation of application No. PCT/KR2011/005590, filed on Jul. 29, 2011.

(30) Foreign Application Priority Data

Jul. 31, 2010   (KR) .......................... 10-2010-0074460
Jun. 28, 2011   (KR) .......................... 10-2011-0063288

(51) Int. Cl.
*H04N 7/32*        (2006.01)
*H04N 19/593*      (2014.01)
(Continued)

(52) U.S. Cl.
CPC ......... *H04N 19/117* (2014.11); *H04N 19/124* (2014.11); *H04N 19/13* (2014.11);
(Continued)

(58) Field of Classification Search
USPC ..................................................... 375/240.12
See application file for complete search history.

(56) References Cited

U.S. PATENT DOCUMENTS

| 2010/0246692 A1* | 9/2010 | Rusanovskyy | ........ H04N 19/46 375/240.29 |
| 2011/0164677 A1* | 7/2011 | Lu | ......................... H04N 19/176 375/240.02 |
| 2012/0033728 A1* | 2/2012 | Cho | ..................... H04N 19/124 375/240.03 |

FOREIGN PATENT DOCUMENTS

| JP | 2005512419   | 4/2005 |
| KR | 1020110036401 | 4/2011 |

OTHER PUBLICATIONS

English translation of KR 1020110036401.*
(Continued)

*Primary Examiner* — Dave Czekaj
*Assistant Examiner* — Alison Slater
(74) *Attorney, Agent, or Firm* — Mintz Levin Cohn Ferris Glovsky and Popeo, P.C.; Kongsik Kim; Jonathon Western

(57) ABSTRACT

Provided is an apparatus for decoding an image that adaptively filters reference pixels according to an intra prediction mode and a size of a prediction block, and generates the prediction block according to the intra prediction mode. When the reference pixels for a second directional intra prediction mode are filtered, the reference pixels for a first directional intra prediction mode, that is closer to an intra prediction mode having the direction of 45° with reference to a horizontal mode than the second directional intra prediction mode is, are also filtered. The first and the second intra prediction modes exist between the horizontal mode and the intra prediction mode having the direction of 45° with reference to the horizontal mode. The number of intra prediction modes in which the filter is applied increases as the size of the prediction block increases.

3 Claims, 5 Drawing Sheets

(51) Int. Cl.
  H04N 19/82    (2014.01)
  H04N 19/117   (2014.01)
  H04N 19/176   (2014.01)
  H04N 19/46    (2014.01)
  H04N 19/157   (2014.01)
  H04N 19/182   (2014.01)
  H04N 19/124   (2014.01)
  H04N 19/13    (2014.01)
  H04N 19/44    (2014.01)
  H04N 19/50    (2014.01)
  H04N 19/61    (2014.01)
  H04N 19/91    (2014.01)
  H04N 19/17    (2014.01)

(52) U.S. Cl.
  CPC ......... *H04N 19/157* (2014.11); *H04N 19/17* (2014.11); *H04N 19/176* (2014.11); *H04N 19/182* (2014.11); *H04N 19/44* (2014.11); *H04N 19/46* (2014.11); *H04N 19/50* (2014.11); *H04N 19/593* (2014.11); *H04N 19/61* (2014.11); *H04N 19/82* (2014.11); *H04N 19/91* (2014.11)

(56) References Cited

OTHER PUBLICATIONS

Shay Har-Noy et al., "Adaptive In-Loop Prediction Refinement for Video Coding", IEEE 9th Workshop on Multimedia Signal Processing, MMSP 2007, Piscataway, NJ, USA, Oct. 1, 2007 (Oct. 1, 2007), pp. 171-174. XP031224804, ISBN: 978-1-4244-1274-7.

Zhou et al., "An interpolation method by predicting the direction of pixel texture changing trend for H.264/AVC intra prediction", Second International Symposium on Intelligent Information Technology Application, IEEE Computer Society, pp. 884-888.

Wiegand et al., "WD3: Working Draft 3 of High-Efficiency Video Coding", JCT-VC (Joint Collaborative Team on Video Coding of ITU-T SG16 WP3 and ISO/IEC JTC1/SC29/WG11) 5. Geneva, Switzerland, Mar. 16-23, 2011, No. JCTVC-E603.

Zheng et al., "CE13: Mode Dependent Hybrid Intra Smoothing", JCT-VC (Joint Collaborative Team on Video Coding of ITU-T SG.16 WP3 abd ISO/IEC JTC1/SC29/WG11) 4. Daegu, Korea, Jan. 20-28, 2011, No. JCTVC-D282.

Sugimoto et al., "LUT-based adaptive filtering on intra prediction samples", JCT-VC (Joint Collaborative Team on Video Coding of ITU-T SG16 WP3 and ISO/IEC JTC1/SC29/WG11) 4. Daegu, Korea, Jan. 20-28, 2011, No. JCTVC-D109.

Zheng et al., "Simplified Intra Smoothing", JCT-VC (Joint Collaborative Team on Video Coding of ITU-T SG16 WP3 and ISO/IEC JTC1/SC29/WG11) 3. Guangzhou, China, Oct. 7-15, 2010, No. JCTVC-C234.

Kim et al., "Description of video coding technology proposal by ETRI", JCT-VC (Joint Collaborative Team on Video Coding of ITU-T SG16 WP3 and ISO/IEC JTC1/SC29/WG11) 1. Dresden, Germany, Apr. 15-23, 2010, No. JCTVC-A127.

Kanumuri et al., "Enhancements to Intra Coding", JCT-VC (Joint Collaborative Team on Video Coding of ITU-T SG16 WP3 and ISO/IEC JTC1/SC29/WG11) 4. Daegu, Korea, Jan. 20-28, 2011, No. JCTVC-D235.

Sugimoto et al., "CE6.f: LUT-based adaptive filtering on intra prediction samples", JCT-VC (Joint Collaborative Team on Video Coding of ITU-T SG16 WP3 and ISO/IEC JTC1/SC29/WG11) 5. Geneva, Switzerland, Mar. 16-23, 2011, No. JCTVC-E069.

McCann et al., "Samsung's Response to the Call for Proposals on Video Compression Technology", JCT-VC (Joint Collaborative Team on Video Coding of ITU-T SG16 WP3 and ISO/IEC JTC1/SC29/WG11) 1. Dresden, Germany, Apr. 15-23, 2010, No. JCTVC-A124.

Winken et al., Description of video coding technology proposal by Fraunhofer HHI, JCT-VC (Joint Collaborative Team on Video Coding of ITU-T SG16 WP3 and ISO/IEC JTC1/SC29/WG11) 1. Dresden, Germany, Apr. 15-23, 2010, No. JCTVC-A116.

Anonymous, "Test Model under Consideration", JCT-VC (Joint Collaborative Team on Video Coding of ITU-T SG16 WP3 and ISO/IEC JTC1/SC29/WG11) 2. Geneva, Switzerland, Jul. 21-28, 2010, No. JCTVC-B205.

* cited by examiner

APPARATUS FOR DECODING AN IMAGE

CROSS-REFERENCE TO RELATED APPLICATIONS

This application is a continuation application of U.S. application Ser. No. 13/624,852, which is a continuation application of International Application No. PCT/KR2011/005590 filed on Jul. 29, 2011, which claims priority to Korean Application No. 10-2010-0074460 filed on Jul. 31, 2010 and Korean Application No. 10-2011-0063288 filed Jun. 28, 2011. The applications are incorporated herein by reference.

TECHNICAL FIELD

The present invention relates to an apparatus for decoding an image, and more particularly, to an apparatus that decodes an image, adaptively generates a prediction block and a residual block according to the intra prediction mode, and thereby generates a reconstructed block.

BACKGROUND ART

In image compression methods such as Motion Picture Experts Group (MPEG)-1, MPEG-2, MPEG-4 and H.264/MPEG-4 Advanced Video Coding (AVC), one picture is divided into macroblocks to encode an image. Then, the respective macroblocks are encoded using inter prediction or intra prediction.

In intra prediction, a current block of a current picture is encoded not using a reference picture, but using values of pixels spatially adjacent to the current block. An intra prediction mode with little distortion is selected by comparing a prediction block generated using the adjacent pixel values with an original macroblock. Then, using the selected intra prediction mode and the adjacent pixel values, prediction values of the current block are calculated. Difference between the prediction values and pixels values of the original current block are calculated and then encoded through transform coding, quantization and entropy coding. The intra prediction mode is also encoded.

Intra prediction are generally classified into 4×4 intra prediction, 8×8 intra prediction and 16×16 intra prediction for luminance components and chrominance components.

In 16×16 intra prediction according to related art, there are four modes of a vertical mode, a horizontal mode, a direct current (DC) mode and a plane mode.

In 4×4 intra prediction according to related art, there are nine modes of a vertical mode, a horizontal mode, a DC mode, a diagonal down-left mode, a diagonal down-right mode, a vertical right mode, a vertical left mode, a horizontal-up mode and a horizontal-down mode.

Each prediction mode has indexed according to the frequency of use of the respective modes. The vertical mode that is mode 0 shows the highest possibility of being used most frequently for performing intra prediction on a target block, and the horizontal-up mode that is mode 8 shows the highest possibility of being used most infrequently. According to H.264 standards, a current block is encoded using a total of 13 modes, that is, 4 modes of the 4×4 intra prediction and 9 modes of the 16×16 intra prediction. A bit stream of the current block is generated according to an optimal mode among these modes.

However, when some or all values of pixels adjacent to current block do not exist or are not already encoded, it is impossible to apply some or all of the intra prediction modes to the current block. Also, when a difference between adjacent reference pixels is large, a difference between a prediction block and an original block becomes large. Therefore, new technique is required to reduce the difference between an original block and a prediction block generated based on positions of reference pixels used for generating the prediction block.

SUMMARY OF THE DISCLOSURE

The present invention is directed to an apparatus for decoding an image for effectively reconstructing a coded image with high compression efficiency by generating or reconstructing a prediction block close to an original image.

One aspect of the present invention provides an apparatus for decoding an image, including: an entropy decoder configured to restore quantized residual coefficients and intra prediction information; a prediction mode decoder configured to restore an intra prediction mode based on the intra prediction information; a residual signal decoder configured to convert the quantized residual coefficients into a residual block; a reference pixel generator configured to generate reference pixels when one or more unavailable reference pixels exist, and to adaptively filter the reference pixels according to the intra prediction mode and a size of a prediction block; a prediction block generator configured to generate the prediction block using reference pixels determined by the intra prediction mode; and an image constructor configured to generate a reconstructed image using the prediction block and the residual block, wherein the reference pixel generator adaptively filters the reference pixels according to the size of the prediction block for intra prediction modes existing between a horizontal mode and an intra prediction mode having a direction of 45° with reference to the horizontal mode, wherein, when the reference pixel generator filters the reference pixels for a second directional intra prediction mode, the reference pixel generator also filters the reference pixels for a first directional intra prediction mode that is closer to the intra prediction mode having the direction of 45° with reference to the horizontal mode than the second directional intra prediction mode is, wherein the second and the first directional intra prediction modes exist between the horizontal mode and the intra prediction mode having the direction of 45° with reference to the horizontal mode, and wherein the number of intra prediction modes in which the filter is applied increases as the size of the prediction block increases. Preferably, the reference pixel generator does not filter the reference pixels when the size of the prediction block is smaller than a predetermined block size.

Preferably, when the intra prediction mode is a planar mode, the prediction block generator generates a reference pixel of a prediction block using a corner reference pixel, a left reference pixel and an upper reference pixel. The apparatus according to the present invention generates reference pixels and adaptively filters the reference pixels in order to generate a prediction block minimizing the difference between a prediction block and an original block. Also, by generating or modifying a prediction block using reference pixels that are not used for generating a prediction block, the prediction block similar to an original block can be reconstructed, and an image compression can be improved.

DETAILED DESCRIPTION OF THE DISCLOSURE

Figure 1:
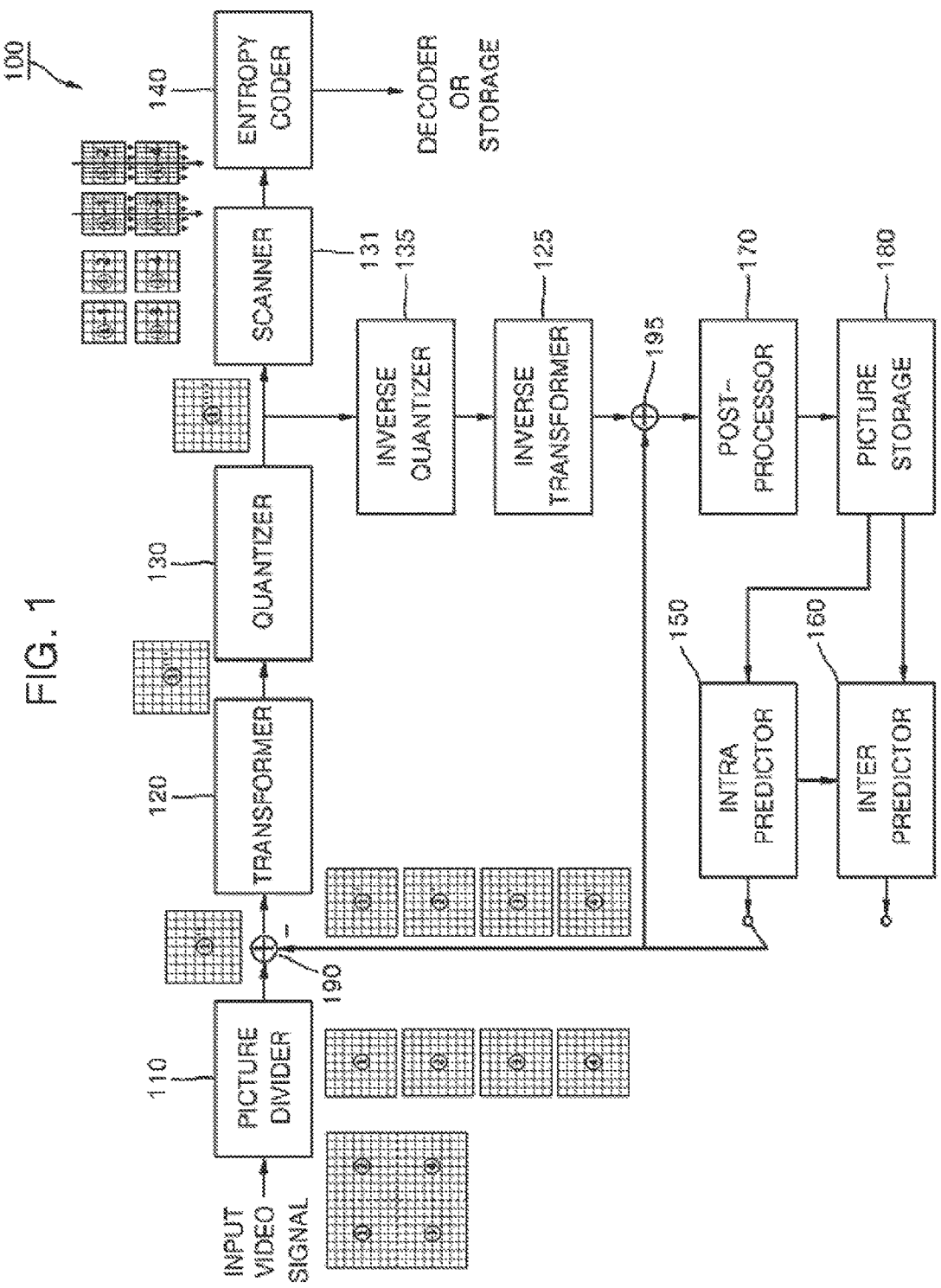
FIG. 1 is a block diagram of a moving picture coding apparatus according to the present invention.

Hereinafter, various embodiments of the present invention will be described in detail with reference to the accompanying drawings. However, the present invention is not limited to the exemplary embodiments disclosed below, but can be implemented in various types. Therefore, many other modifications and variations of the present invention are possible, and it is to be understood that within the scope of the disclosed concept, the present invention may be practiced otherwise than as has been specifically described.

For image coding, each picture consists of one or more slices, and each slice consists of a plurality of coding units. Since an image of a high-definition (HD) grade or higher has many smooth regions, an image compression can be improved by encoding the image with coding units of various sizes.

Coding units according to the present invention have a quad tree structure and can be hierarchically divided using depth information. A coding unit of the largest size is referred to as a largest coding unit (LCU), and a coding unit of the smallest size is referred to as a smallest coding unit (SCU). Information relating to the LCU and the SCU may be included in a sequence parameter set (SPS) and transmitted.

A LCU consists of one or more coding units. The LCU may be one coding unit or may be divided into a plurality of coding units. When the LCU is one coding unit, the coding tree may contain one coding unit and information indicating that the LCU is not divided and one coding unit. When the LCU is divided into four coding units, the coding tree may contain four sub-coding trees and information indicating that the LCU is divided. Likewise, each sub-coding tree has the same structure as the LCU. However, a coding unit of the SCU size is not divided into coding units.

Meanwhile, each coding unit in the coding tree is subjected to intra prediction or inter prediction in units of the coding unit itself or a sub-partition. A unit in which the intra prediction or the inter prediction is performed is referred to as a prediction unit. A size of the prediction unit may be 2N×2N or N×N in intra prediction. A size of the prediction unit may be 2N×2N, 2N×N, N×2N or N×N in inter prediction. Here, 2N denotes horizontal and vertical lengths of the coding unit.

Meanwhile, a prediction unit for intra prediction may not be a square. For example, a square coding unit may be divided into four hN×2N prediction units or four 2N×hN prediction units for intra prediction. In this case, the distance between a reference pixel and a pixel of a prediction block for intra prediction is reduced, such that prediction efficiency can be improved. This intra prediction method is short distance intra prediction (SDIP).

A coding unit includes prediction mode and size information (part mode) of each prediction unit within the coding unit. To improve coding efficiency, the prediction mode and the size information may be combined and joint-coded. In this case, each coding unit includes a joint-coded prediction type.

A coding unit includes additional information required for generating a prediction block of each prediction unit and a residual signal. The additional information is defined per prediction unit. In intra prediction, the additional information includes encoded intra prediction information. In inter prediction, the additional information includes encoded motion information. The motion information includes a motion vector and a reference picture index.

A residual signal is included in each coding unit. A residual signal includes one transform tree, one luminance residual signal carrier and two chrominance residual signal carriers. The residual signal carriers include encoded residual information on one or more transform units. The largest size of the transform unit is equal to or smaller than the size of the coding unit. The transform unit may have the same size as the largest transform unit or a sub-transform unit of the largest transform unit.

The transform tree includes information indicating a division structure of the transform unit for the residual signal included in the coding unit. Also, the transform tree includes information indicating whether or not a residual signal of each transform unit is 0.

The residual signal carrier carries encoded residual information on transform units corresponding to the information indicating the division structure in the transform tree in units of coding units.

Although the above description has been made of only a prediction unit obtained by equally dividing a coding unit, unequal division is also possible. In other words, for compressing a residual signal, it may be more effective to unequally divide an image signal in a specific direction according to a boundary of an image and perform intra or inter prediction.

The simplest adaptive mode is to divide a coding unit into two blocks using a straight line so as to extract statistical dependency of a prediction region on local topography. A boundary of an image is matched to straight line and divided. In this case, dividable directions may be limited to a predetermined number. For example, a method of dividing a block may be limited to four directions of horizontal, vertical, upward diagonal and downward diagonal directions. Also, the division may be limited to the horizontal and vertical directions only. The number of dividable directions can be three, five, seven, and so on. The number of dividable directions may vary according to a size of the coding block. For example, for a coding unit of a large size, the number of dividable directions may be relatively increased.

In inter prediction, when one coding unit is divided into two prediction units for more adaptive prediction, motion estimation and motion compensation should be performed on each of prediction units. After prediction blocks are derived from the respective two prediction units divided from the one coding unit, the two prediction blocks may be added to generate the prediction block having the same size as the coding unit. In this case, to reduce difference between pixel values on both sides of a division boundary of the prediction block of the coding unit size, pixels positioned at the division boundary may be filtered. The prediction block may be generated such that the prediction blocks corresponding to the respective prediction units overlap, and the overlapping boundary portion may be smoothed to generate the one prediction block.

FIG. 1 is a block diagram of a moving picture coding apparatus according to the present invention.

Referring to FIG. 1, a moving picture coding apparatus 100 according to the present invention includes a picture divider 110, a transformer 120, a quantizer 130, a scanner 131, an entropy coder 140, an intra predictor 150, an inter predictor 160, an inverse quantizer 135, an inverse transformer 125, a post-processor 170, a picture storage 180, a subtracter 190 and an adder 195.

The picture divider 110 analyzes an input video signal to divide each LCU of a picture into one or more coding units each of which has a predetermined size, determine prediction mode of each coding unit, and determines size of prediction unit per each coding unit. The picture divider 110 sends the prediction unit to be encoded to the intra predictor 150 or the inter predictor 160 according to the prediction mode. Also, the picture divider 110 sends the prediction units to be encoded to the subtracter 190.

The transformer 120 transforms a residual signal between an original block of an input prediction unit and a prediction block generated by the intra predictor 150 or the inter predictor 160. The residual block may have a size of coding unit. The residual block may be divided into optimal transform units and transformed. A transform matrix type may be adaptively determined according to the prediction mode and the intra prediction mode. The transform unit of the residual signal may be transformed by horizontal and vertical one-dimensional (1D) transform matrices. In inter prediction, one predetermined transform matrix type is applied. In intra prediction, there is a high possibility that the residual signal will have vertical directivity when the intra prediction mode of the current prediction unit is horizontal.

Thus, a discrete cosine transform (DCT)-based integer matrix is applied to the vertical direction, and a discrete sine transform (DST) or Karhunen Loève transform (KLT)-based integer matrix is applied to the horizontal direction. When the intra prediction mode is vertical, a DST or KLT-based integer matrix is applied to the vertical direction, and a DCT-based integer matrix is applied to the horizontal direction. Alternatively, in intra prediction, the transform matrix may be adaptively determined according to the size of the transform unit.

The quantizer 130 determines a quantization step size for quantizing transform coefficients of the residual block according to coding units. The quantization step size is determined per coding unit size equal to or larger than a predetermined size. The predetermined size may be 8×8 or 16×16. Using the determined quantization step size and a quantization matrix determined according to a prediction mode, the transform coefficients are quantized. The quantizer 130 uses quantization step sizes of the coding units adjacent to the current coding unit to generate a quantization step size predictor of the current coding unit. The quantizer 130 sequentially searches a left coding unit, an upper coding unit and an upper left coding unit of the current coding unit, determines the quantization step size predictor of the current coding unit using quantization step sizes of one or more valid coding units, and transmits a difference between the quantization step size and the quantization step size predictor of the current coding unit to the entropy coder 140.

When a slice is divided into coding units, there may be none of a left coding unit, an upper coding unit and an upper left coding unit of the current coding unit. On the other hand, there may be a previous coding unit of the current coding unit in a coding order. Thus, coding units adjacent to the current coding unit and the previous coding unit may be candidates. In this case, priority may be sequentially given to 1) the left coding unit of the current coding unit, 2) the upper coding unit of the current coding unit, 3) the upper left coding unit of the current coding unit and 4) the previous coding unit of the current coding unit. The sequence may vary, or the upper left coding unit may be omitted.

The quantized transform block is provided to the inverse quantizer 135 and the scanner 131.

The scanner 131 scans the quantized transform coefficients of the quantized transform block, thereby converting the quantized transform coefficients into 1D quantized transform coefficients. A coefficient scanning method is determined according to the prediction mode and the intra prediction mode. Also, the coefficient scanning method may be determined differently according to the size of the transform units. The scanner 131 determines whether or not to divide a quantized transform block into a plurality of subsets on the basis of a size of the current transform unit. When the size of the transform unit is larger than a first reference size, the scanner 131 divides the quantized transform block into a plurality of subsets. The first reference size may be 4×4 or 8×8.

The scanner 131 determines a scan pattern to be applied to the quantized transform block. In inter prediction, only one predetermined scan pattern (e.g., zigzag scan) can be applied. In intra prediction, a scan pattern determined according to the intra prediction mode can be applied. The scan pattern may vary according to a directional intra prediction mode. Zigzag scan is applied to non-directional intra prediction modes. A non-directional mode may be a direct current (DC) mode or a planar mode. The quantized transform coefficients are scanned in a reverse direction.

When the quantized transform coefficients are divided into the plurality of subsets, the same scan pattern is applied to the quantized coefficients in each subset. The plurality of subsets consist of one main subset and one or more residual subsets. The main subset is located at an upper left side and includes a DC coefficient and the one or more residual subsets cover region other than the main subset.

Zigzag scan may be applied to scan the subsets. The subsets may be scanned beginning with the main subset to the residual subsets in a forward direction, or can be scanned in a reverse direction. A scan pattern for scanning the subsets may be set the same as a scan pattern for scanning the quantized transform coefficients. In this case, the scan pattern for scanning the subsets is determined according to the intra prediction mode. An encoder transmits information capable of indicating a position of the last non-zero quantized coefficient of the transform unit to a decoder. The encoder also transmits information capable of indicating a position of the last non-zero quantized coefficient in each subset to the decoder.

The inverse quantizer 135 inversely quantizes the quantized transform coefficients. The inverse transformer 125 restores a residual block of the spatial domain from the inversely quantized transform coefficients. The adder 195 generates a reconstruction block by adding the residual block reconstructed by the inverse transformer 125 and the prediction block from the intra predictor 150 or the inter predictor 160.

The post-processor 170 performs a deblocking filtering process for removing blocking artifact generated in a reconstructed picture, an adaptive offset application process for complementing a difference between the reconstructed picture and the original image per pixel, and an adaptive loop filter process for complementing a difference between the reconstructed picture and the original image in a coding unit.

The deblocking filtering process may be applied to a boundary between predictive coding blocks and between transform blocks. The boundary is an edge of a grid having a predetermined size or more and the predetermined size may be 8×8. The deblocking filtering process includes a step of determining a boundary to be filtered, a step of determining boundary filtering strength to be applied to the boundary, a step of determining whether or not to apply a deblocking filter, and a step of selecting a filter to be applied to the boundary when it is determined to apply the deblocking filter.

Whether or not to apply the deblocking filter is determined according to i) whether or not the boundary filtering strength is greater than 0 and ii) whether or not a value indicating the difference between boundary pixels of P block and Q block is smaller than a first reference value determined according to a quantization parameter.

Two or more filters may exist. When an absolute value of a difference between two pixels adjacent to the block boundary is equal to or larger than a second reference value, a weak filter is selected. The second reference value is determined by the quantization parameter and the boundary filtering strength.

The adaptive offset application process is intended to reduce a difference (distortion) between a pixel subjected to the deblocking filter and the original pixel. A picture or slice may be divided into a plurality of offset regions, and an offset mode may be determined per the offset region. There are four edge offset modes, two band offset modes and an offset non-application mode. According to each offset mode, pixels in each offset region are classified into a predetermined number of classes, and offset corresponding to the classified class is added to the pixel. In the case of an edge offset mode, a class of a current pixel is determined by comparing the current pixel value with pixel values of two or more pixels adjacent to the current pixel.

The adaptive loop filter process may be performed on the basis of a value obtained by comparing an original image and a reconstructed image to which the deblocking filtering process or the adaptive offset application process is applied. An adaptive loop filter (ALF) is detected through one Laplacian activity value on the basis of a 4×4 block. The determined ALF can be applied to all pixels included in a 4×4 block or an 8×8 block. Whether or not to apply an ALF may be determined according to coding units. A size and coefficients of a loop filter may vary according to each coding unit. Information indicating whether the ALF is applied to each coding unit, filter coefficient information, filter shape information, etc. may be included in slice header and transmitted to the decoder. In the case of a chrominance signal, whether or not to apply the ALF may be determined in picture units. Unlike luminance, the loop filter may have a rectangular shape.

The picture storage 180 receives post-processed image data from the post-processor 170, and stores the image in picture units. A picture may be a frame or a field. The picture storage 180 has a buffer (not shown) capable of storing a plurality of pictures.

The inter predictor 160 performs motion estimation using one or more reference pictures stored in the picture storage 180, and determines a reference picture index indicating the reference pictures and a motion vector. According to the reference picture index and motion vector, the inter predictor 160 extracts a prediction block corresponding to a prediction unit to be encoded from a reference picture selected among a plurality of reference pictures stored in the picture storage 180 and outputs the extracted prediction block.

The intra predictor 150 performs intra prediction using a reconstructed pixel value in a picture including a current prediction unit. The intra predictor 150 receives the current prediction unit to be predictively encoded, selects one of a predetermined number of intra prediction modes, and performs intra prediction. The predetermined number of intra prediction modes depends on a size of the current prediction unit. The intra predictor 150 adaptively filters reference pixels used to generate the intra prediction block. When some of reference pixels are not valid, it is possible to generate the reference pixels at the invalid positions using valid reference pixels.

The entropy coder 140 entropy-codes the quantized transform coefficients from the quantizer 130, intra prediction information received from the intra predictor 150, motion information received from the inter predictor 160, and so on.

Figure 2:
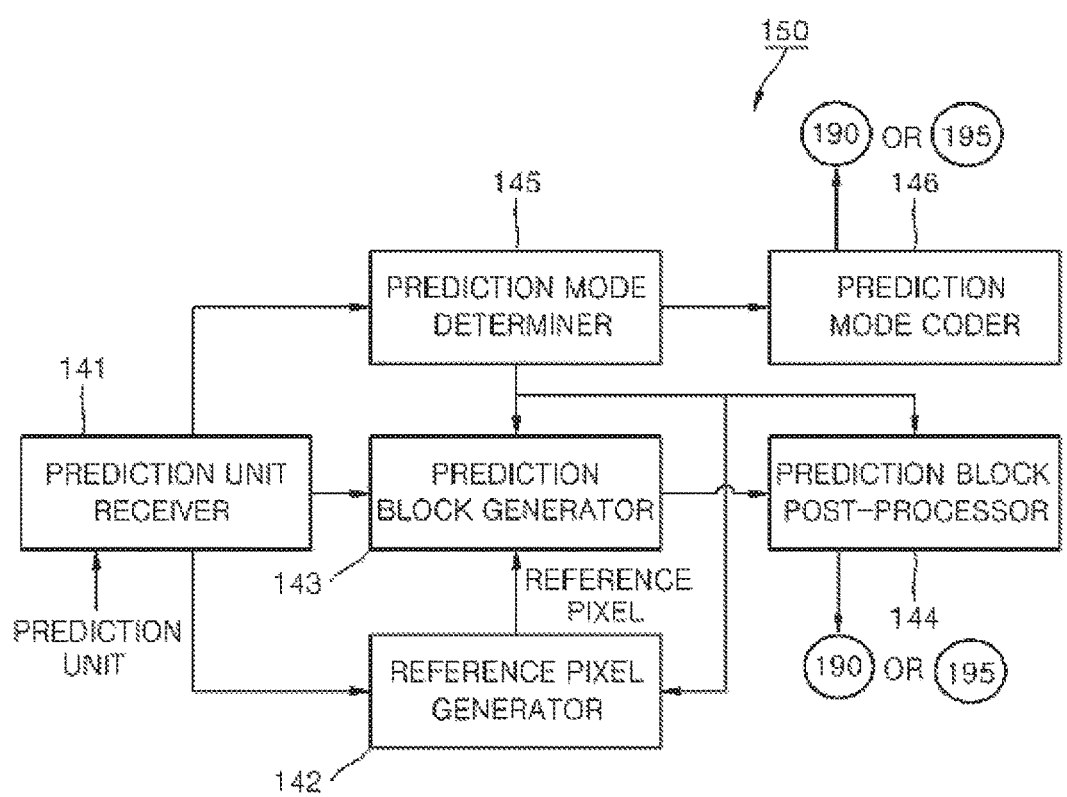
FIG. 2 is a block diagram of an intra predictor according to the present invention.

FIG. 2 is a block diagram of an intra predictor 150 according to the present invention.

Referring to FIG. 2, the intra predictor 150 includes a prediction unit receiver 141, a reference pixel generator 142, a prediction block generator 143, a prediction block post-processor 144, a prediction mode determiner 145 and a prediction mode coder 146.

The prediction unit receiver 141 receives a prediction unit as input. The prediction unit receiver 141 transmits size information on the received prediction unit to the prediction mode determiner 145 and the reference pixel generator 142, and transmits the prediction unit to the reference pixel generator 142 and the prediction block generator 143.

The reference pixel generator 142 determines whether reference pixels of the received current prediction unit are available. The reference pixels of the current prediction unit used for intra prediction consist of a corner reference pixel positioned at (x=−1, y=−1), 2L upper reference pixels positioned at (x=0, . . . , 2L−1, y=−1), and 2M left reference pixels positioned at (x=0, y=0, . . . , and 2M−1). Here, L is a width of the current prediction unit, and M is a height of the current prediction unit.

When the reference pixels are unavailable or insufficient, reference pixels are generated.

When no reference pixels are available, reference pixels are generated with a predetermined value.

When some of the reference pixels are unavailable, it is determined whether the unavailable reference pixels exist in only one direction from available pixels or between the available pixels.

When the unavailable reference pixels exist in only one direction from the available pixels, reference pixels are generated by copying the value of an available pixel closest to the unavailable pixel. For example, when the current prediction unit is positioned at an upper boundary of a picture or a slice, the corner reference pixel and the upper reference pixels are unavailable. Thus, in this case, the corner reference pixel and the upper reference pixels can be generated by copying a reference pixel positioned at (x=−1, y=0). Alternatively, reference pixels may be generated using an available reference pixel of the closest position and one or more available reference pixels. For example, when the corner reference pixel and reference pixels at positions (x=0, . . . , and L−1, y=−1) are available and reference pixels at positions (x=L, . . . , 2L−1, y=−1) are unavailable, reference pixels at the unavailable positions can be generated using change in difference between a reference pixel value at a position (x=L−1, y=−1) and a corner reference pixel value or another reference pixel value.

When the unavailable reference pixels exist between the available pixels, reference pixels are generated using two available pixels p and q adjacent to the unavailable reference pixels. For example, when the corner reference pixel and the upper reference pixels positioned at (x=0, . . . , and L−1, y=−1) are unavailable, reference pixels existing between the reference pixel p at a position (x=−1, y=0) and the reference pixel q at a position (x=L, y=−1) can be generated using the reference pixels p and q.

The generated reference pixel values may be obtained by rounding off an average of the reference pixel p and the reference pixel q. Also, the reference pixel values may be generated using change in difference between pixels values of the reference pixel p and the reference pixel q. In this case, the reference pixel values may be generated by linear interpolation determined according to positions corresponding to the generated pixel values or using a weighted average of the two reference pixels.

Meanwhile, when a plurality of prediction units are on an upper side of the current prediction unit, there is a high possibility that a difference between boundary pixels present on both sides of a boundary between two of the upper prediction units will be higher than a difference between adjacent pixels in each upper prediction unit. This results from an error caused by a quantization parameter. It is highly probable that the error will occur in directional intra prediction modes in which a prediction pixel of the prediction block is generated using two adjacent reference pixels.

Figure 3:
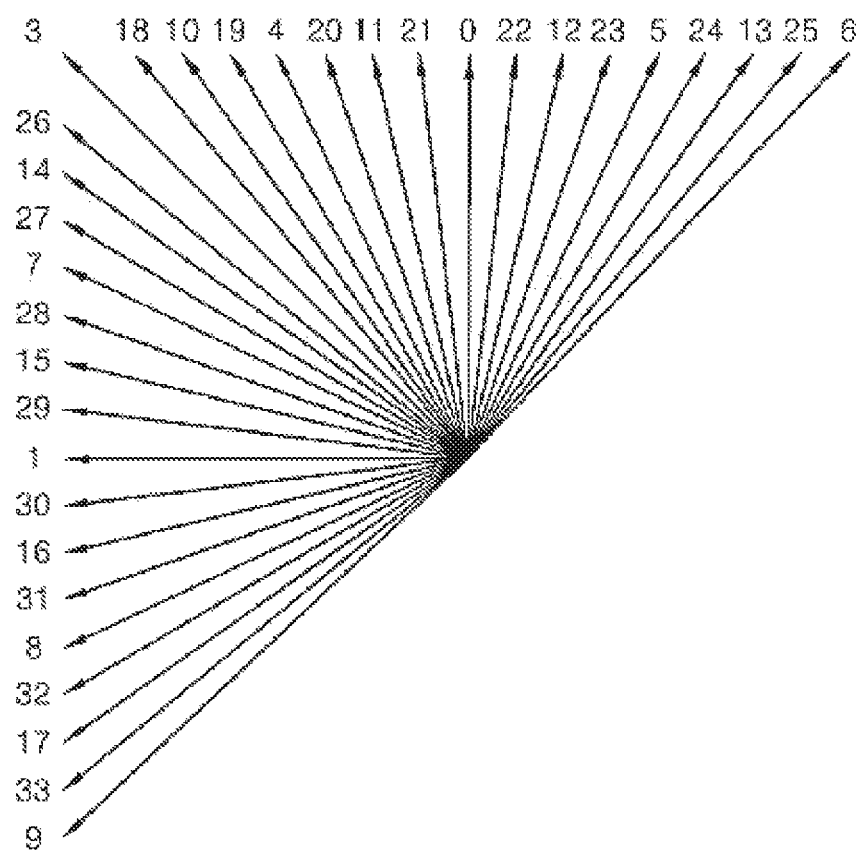
FIG. 3 is a conceptual diagram showing directional intra prediction modes according to the present invention.

In particular, the modes (mode numbers 3, 6 and 9) having a direction of 45° with reference to the horizontal or vertical direction of FIG. 3 are most seriously affected. In the vertical and horizontal intra prediction modes (mode numbers 0 and 1), one pixel is used to generate a prediction pixel of a prediction block, and thus the vertical and horizontal intra prediction modes are slightly affected.

For this reason, a filter (smoothing filter) is applied to the reference pixels in the directional intra prediction modes 3, 6 and 9, and is not applied to the reference pixels in the vertical and horizontal intra prediction modes. In the DC mode among the non-directional intra prediction modes, the filter is not applied to reference pixels either. For these modes, whether or not to apply the filter may be determined regardless of the size of the current prediction unit.

In directional intra prediction modes existing between the intra prediction mode 3, 6 or 9 and the horizontal or vertical intra prediction mode, the filter can be adaptively applied to reference pixels according to the size of the prediction unit. It is preferable to increase a probability of applying the filter as the direction of the directional intra prediction mode is relatively closer to the direction of the intra prediction mode having the direction of 45°. Specifically, when a first directional intra prediction mode is closer in directivity to the intra prediction mode having the direction of 45° than a second directional intra prediction mode, if a filter is applied to the reference pixels in the second directional intra prediction mode, the filter is also applied to the reference pixels in the first directional intra prediction mode. On the other hand, if the filter is applied to the reference pixels in the first directional intra prediction mode, the filter may or may not be applied to the reference pixels in the second directional intra prediction mode.

There is a high possibility that a change in difference between pixels in a prediction unit of a large size will be less than a change in difference between pixels in a prediction unit of a small size. Thus, the number of directional modes in which the filter is applied may increase or the stronger filter may be applied as the size of the prediction unit increases. On the other hand, when a prediction unit becomes smaller than a specific size, the filter may not be applied.

For one example, in the intra prediction mode 3, 6 or 9, a first filter may be applied to reference pixels of a prediction unit having a size equal to or smaller than a first size, and a second filter that is stronger than the first filter may be applied to reference pixels of a prediction unit having a size larger than the first size. The first size may vary according to directional prediction modes.

For another example, in the intra prediction mode 5 existing between the vertical intra prediction mode and the intra prediction mode 6, no filter may be applied to a prediction unit having a size equal to or smaller than a second size, the first filter may be applied to reference pixels of a prediction unit having a size larger than the second size and equal to or smaller than a third size, and the second filter may be applied to a prediction unit having a size larger than the third size. The second size and the third size may vary according to directional prediction modes.

The first filter may be a 3-tap filter [1, 2, 1] or a 5-tap filter [1, 2, 4, 2, 1]. The second filter has a greater smoothing effect than the first filter.

The prediction block generator 143 generates a prediction block using reference pixels determined by the intra prediction mode.

In the directional intra prediction mode, the corresponding reference pixels vary according to the intra prediction mode. For example, in the vertical mode, L upper reference pixels positioned at (x=0, . . . , and L−1, y=−1) are used, and in the horizontal mode, L left reference pixels positioned at (x=−1, y=0, . . . , and L−1) are used.

In non-directional intra prediction mode, the corner pixel, the L upper reference pixels positioned at (x=0, . . . , and L−1, y=−1) and the L left reference pixels positioned at (x=−1, y=0, . . . , and L−1) are used. The non-directional intra prediction mode is the DC mode or the planar mode.

In the planar mode, a reference pixel of a prediction block is generated using the corner reference pixel, a left reference pixel and an upper reference pixel. When a reference pixel to be generated is positioned at (a, b), a prediction pixel X(a, b) is generated using the corner reference pixel C(x=−1, y=−1), an upper reference pixel T(x=a, y=−1) and a left reference pixel L(x=−1, y=b). Specifically, X(a, b)=L(x=−1, y=b)+T(x=a, y=−1)−C(x=−1, y=−1).

In the intra prediction mode existing to the right side of the vertical mode of FIG. 3, a possibility that a difference between pixel of a lower left region of the generated prediction block and corresponding pixel of the original prediction unit will increase if the prediction block is generated using only upper reference pixels. However, when a prediction block is generated using upper reference pixels and left reference pixels, the difference can be reduced. This effect is greatest in the intra prediction mode 6. Also in intra prediction modes existing under the horizontal mode of FIG. 3, same method may be applied, and the effect is greatest in the intra prediction mode 9.

Thus, in the intra prediction mode 6 or 9, a prediction pixel may be generated using one upper interpolation reference pixel and one left interpolation reference pixel. The prediction pixel may be generated by linear interpolation of the one upper interpolation reference pixel and the one left interpolation reference pixel or using an average that is rounded off. Likewise, in a predetermined number of intra prediction modes adjacent to mode 6 or 9, a prediction block can be generated using the left reference pixels and the upper reference pixels. For example, in intra prediction mode 6 or a mode belonging to the predetermined number of (e.g., four) prediction modes adjacent to mode 6, the left reference pixels and the upper reference pixels can be used to generate a prediction block. In this case, to reduce complexity, the aforementioned method may not be applied in intra prediction modes having mode numbers greater than a predetermined mode number (e.g., 9 or 17). Also, the method may be applied to only a current prediction unit having a size equal to or larger than a predetermined size. The predetermined size is 8×8 or 16×16.

The prediction block post-processor 144 adaptively filters the prediction block generated by the prediction block generator 143. To reduce a difference between a reference pixel and a prediction pixel adjacent to the reference pixel, the prediction block post-processor 144 adaptively filters some or all prediction pixels adjacent to the reference pixel not used to generate the prediction block according to the intra prediction mode.

In the planar mode, the prediction pixels are generated using all reference pixels adjacent to the prediction pixel, and thus no filter is applied.

In the DC mode, an average of reference pixels is used to generate prediction pixel, and thus a filter is applied. Different type of filter can be used according to the size of prediction unit. In a prediction unit of a large size, a filter that is the same as used in a prediction unit of a small size or a strong filter having a great smoothing effect can be used.

The prediction mode determiner 145 determines the intra prediction mode of the current prediction unit using reference pixels. The prediction mode determiner 145 may select one intra prediction mode with minimum coded bits of a residual block among intra prediction modes of the current prediction unit.

The prediction mode coder 146 encodes the intra prediction mode of the current prediction unit using intra prediction modes of prediction units adjacent to the current prediction unit.

Figure 4:
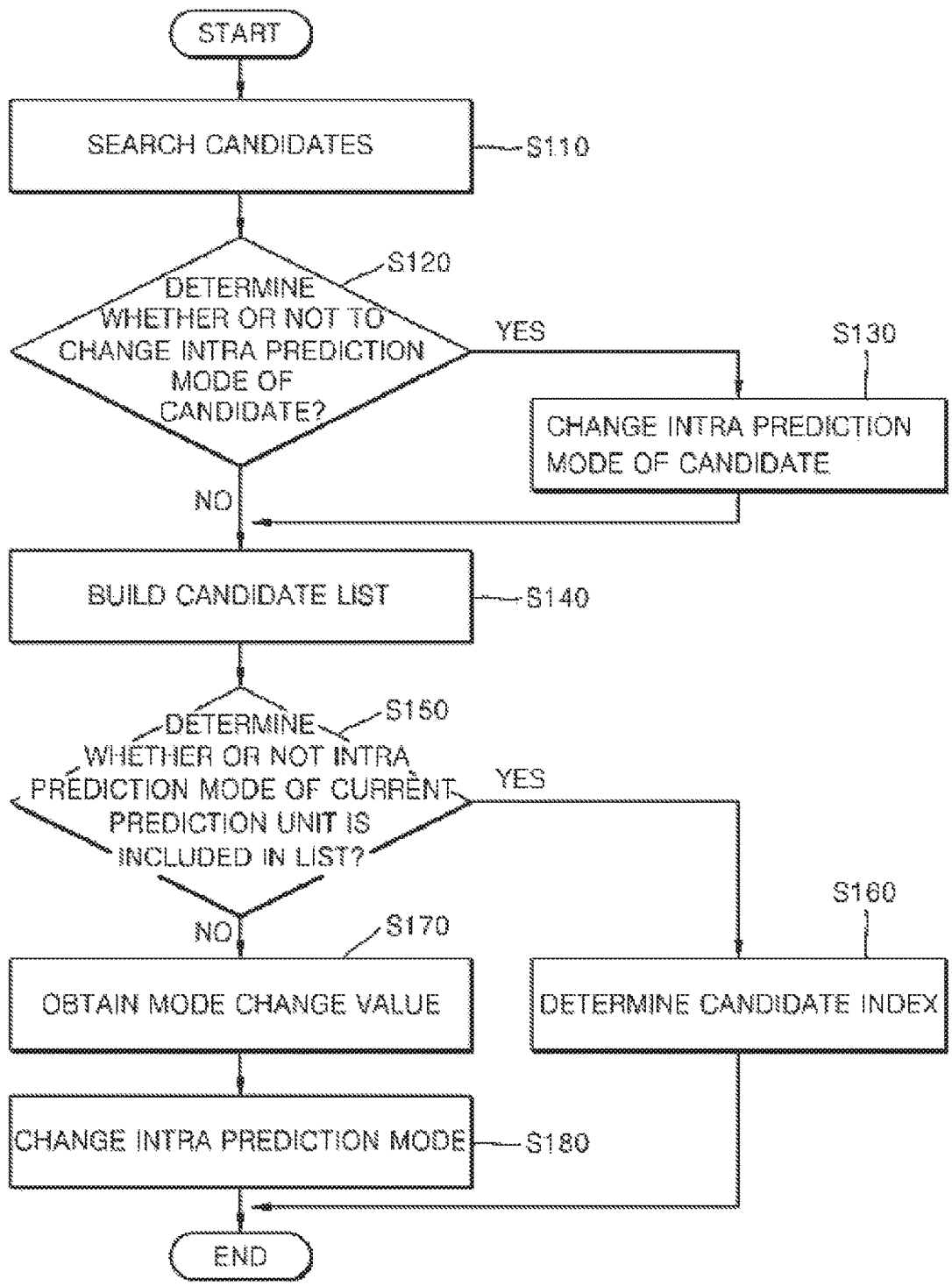
FIG. 4 a flow chart illustrating a process of encoding an intra prediction mode of a prediction unit performed in a prediction mode coder according to the present invention.

FIG. 4 is a flow chart illustrating a process of encoding an intra prediction mode of a current prediction unit performed in the prediction mode coder 146 according to the present invention.

First, intra prediction mode candidates of a current prediction unit are searched for (S110). An upper intra prediction mode and a left intra prediction mode of the current prediction unit may be the intra prediction mode candidates. A corner intra prediction mode may also be added, or a new mode may be added according to the upper intra prediction mode and the left intra prediction mode.

When there are a plurality of upper prediction units of the current prediction unit, the plurality of upper prediction units are scanned in a predetermined direction (e.g., from right to left) to determine the intra prediction mode of a first valid prediction unit as an upper intra prediction mode. Also, when there are a plurality of left prediction units of the current prediction unit, the plurality of left prediction units are scanned in a predetermined direction (e.g., from bottom to top) to determine the intra prediction mode of a first valid prediction unit as a left intra prediction mode. Alternatively, among a plurality of valid prediction units, the intra prediction mode of a valid prediction unit having the lowest intra prediction mode number may be set as an upper intra prediction mode.

The corner intra prediction mode may be set as a prediction mode of a prediction unit adjacent to the upper right side or the upper left side of the current prediction unit. Alternatively, the corner intra prediction mode may be set as a first valid intra prediction mode obtained by scanning intra prediction modes adjacent to the upper left side, the upper right side and a lower right side of the current prediction unit in a predetermined order. The predetermined order is the upper left side, the lower right side and the upper right side. Alternatively, two (upper right side and upper left side) or three (upper right side, upper left side and lower left side) corner intra prediction modes may be added as intra prediction mode candidates of the current prediction unit.

Next, it is determined whether or not to change intra prediction mode candidate of the valid intra prediction mode candidates (S120).

When it is determined to change the intra prediction mode, the valid intra prediction mode candidate is changed (S130).

Specifically, when the mode number of a valid intra prediction mode candidate is equal to or greater than the number of intra prediction modes permissible for the current prediction unit, the valid intra prediction mode candidate is converted into one of the permissible modes. The number of permissible modes may vary according to a size of the current prediction unit. For example, when the size of the current prediction unit is 4×4, the intra prediction mode of the valid intra prediction mode candidate is converted into one of nine modes (mode 0 to mode 8) or 18 modes, and when the size of the current prediction unit is 64×64, the intra prediction mode value of the valid intra prediction mode candidate is converted into one of four modes (mode 0 to mode 2).

Next, an intra prediction candidate list of the current prediction unit is built (S140). The candidates may be listed in mode number order. Alternatively, the candidates may be listed in frequency order, and intra prediction candidates having the same frequency may be listed in mode number order. When a plurality of intra prediction candidates have the same mode, the intra prediction candidates except one are removed from the list.

Next, it is determined whether the intra prediction mode of the current prediction unit is the same as any one of the intra prediction mode candidates in the built list (S150).

When the intra prediction mode of the current prediction unit is the same as one of the intra prediction mode candidates, information indicating that the intra prediction mode is the same as one of the intra prediction mode candidates and a candidate index specifying the one intra prediction mode are determined as intra prediction information (S160).

When the intra prediction mode of the current prediction unit is not the same as any of the intra prediction mode candidates, a mode change value for changing the intra prediction mode of the current prediction unit is calculated (S170). The mode change value is the number of intra prediction mode candidates having intra prediction mode number that are not greater than the intra prediction mode number of the current prediction unit.

Next, the intra prediction mode of the current prediction unit is changed using the mode change value (S180). The changed intra prediction mode is determined as candidate index of the current prediction unit. The changed intra prediction mode of the current prediction unit is transmitted to the entropy coder 140.

Figure 5:
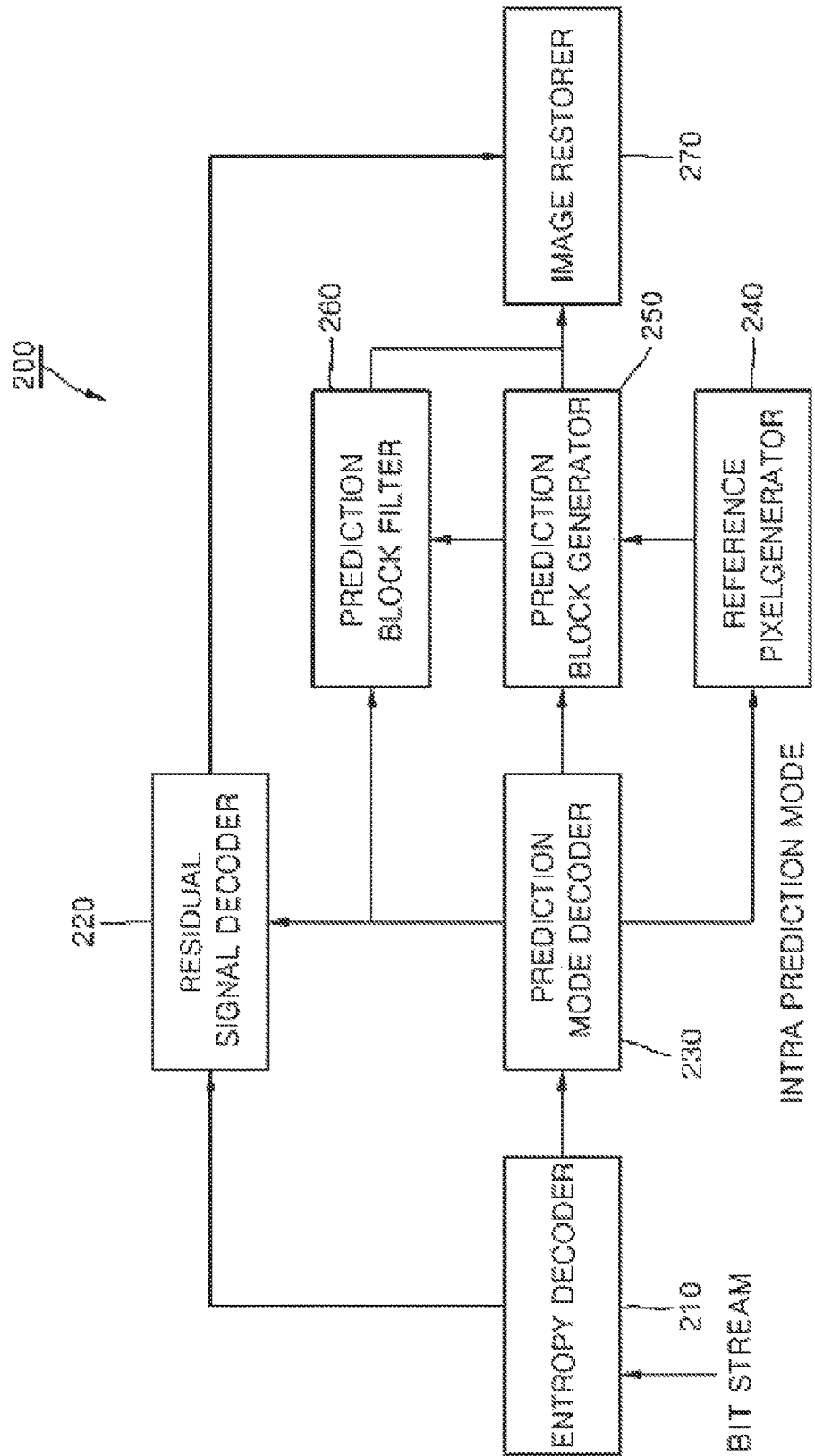
FIG. 5 is a block diagram of an intra prediction decoding apparatus according to the present invention.

FIG. 5 is a block diagram of an intra prediction decoding apparatus 200 according to the present invention.

The intra prediction decoding apparatus 200 according to the present invention includes an entropy decoder 210, a residual signal decoder 220, a prediction mode decoder 230, a reference pixel generator 240, a prediction block generator 250, a prediction block filter 260 and an image reconstructor 270.

The entropy decoder 210 extracts quantized residual coefficients from a received bit stream, and transmits the quantized residual coefficients of the transform unit and a size of the transform unit to the residual signal decoder 220. Also, the entropy decoder 210 transmits intra prediction information and a size of a prediction unit to be decoded to the prediction mode decoder 230.

The residual signal decoder 220 converts the quantized residual coefficients into inverse-quantized block of a two dimensional (2D) array. For this conversion, one of a plurality of scan patterns is selected. The scan pattern of the transform block is determined on the basis of at least one of the prediction mode and the intra prediction mode. An inverse scanning operation is the same as an inverse process of operation of the scanner 131 of FIG. 1. For example, when a size of the current transform unit to be decoded is larger than a first reference size, the quantized residual coefficients are inversely scanned to form a plurality of subsets according to the scan pattern, and an inverse-quantized block having the size of the transform unit is generated using the plurality of subsets. On the other hand, when the size of the current transform unit to be decoded is not larger than the first reference size, the quantized residual coefficients are inversely scanned to generate an inverse-quantized block according to the scanning pattern.

The prediction mode decoder 230 restores the intra prediction mode of the current prediction mode on the basis of the intra prediction information and the size information on the current prediction unit received from the entropy decoder 210. The received intra prediction information is restored through an inverse process of the process shown in FIG. 4.

The reference pixel generator 240 generates unavailable reference pixels of the current prediction unit, and adaptively filters the reference pixels according to the intra prediction mode of the current prediction unit received from the prediction mode decoder 230. A method of generating the reference pixels and a method of filtering the reference pixels are the same as those of the reference pixel generator 142 in the intra predictor 150 of FIG. 2.

Specifically, it is determined whether reference pixels of the current prediction unit are available. The reference pixels of the current prediction unit used for intra prediction consist of a corner reference pixel positioned at (x=−1, y=−1), 2L upper reference pixels positioned at (x=0, . . . , and 2L−1, y=−1), and 2M left reference pixels positioned at (x=0, y=0, . . . , and 2M−1). Here, L is a width of the current prediction unit, and M is a height of the current prediction unit.

When the reference pixels for generating a prediction block are unavailable or insufficient, reference pixels are generated.

When all the reference pixels are unavailable, reference pixels are generated with a predetermined value.

When some of the reference pixels are unavailable, it is determined whether the unavailable reference pixels exist in only one direction from available pixels or between the available pixels.

When the unavailable reference pixels exist in only one direction from the available pixels, reference pixels are generated by copying the value of an available pixel closest to the unavailable pixel. For example, when the current prediction unit is positioned at an upper boundary of a picture or a slice, the corner reference pixel and the upper reference pixels are unavailable. Thus, in this case, the corner reference pixel and the upper reference pixels can be generated by copying a reference pixel positioned at (x=−1, y=0). Alternatively, reference pixels may be generated using an available reference pixel of the closest position and one or more available reference pixels. For example, when the corner reference pixel having a position (x=−1, y=−1) and reference pixels at positions (x=0, . . . , and L−1, y=−1) are available and reference pixels at positions (x=L, . . . , 2L−1, y=−1) are unavailable, reference pixels at the unavailable positions can be generated using change in difference between a reference pixel at a position (x=L−1, y=−1) and a corner reference pixel value or another reference pixel value.

When the unavailable reference pixels exist between the available pixels, reference pixels are generated using two available pixels p and q adjacent to the unavailable reference pixels. For example, when the corner reference pixel and the L upper reference pixels positioned at (x=0, . . . , and L−1, y=−1) are unavailable, reference pixels existing between the reference pixel p at a position (x=−1, y=0) and the reference pixel q at a position (x=L, y=−1) can be generated using the reference pixels p and q.

The generated reference pixel values may be obtained by rounding off an average of the reference pixel p and the reference pixel q. Also, the reference pixel values may be generated using change in difference between pixels values of the reference pixel p and the reference pixel q. In this case, the reference pixel values may be generated by linear interpolation determined according to positions corresponding to the generated pixel values or using a weighted average of the two reference pixels.

Meanwhile, when a plurality of prediction units are on an upper side of the current prediction unit, there is a high possibility that a difference between boundary pixels present on both sides of a boundary between two of the upper prediction units will be higher than a difference between adjacent pixels in each upper prediction unit. This results from an error caused by a quantization parameter. It is highly probable that the error will occur in directional intra prediction modes in which a prediction pixel of the prediction block is generated using two adjacent reference pixels.

In particular, modes (mode numbers 3, 6 and 9) having a direction of 45° with reference to a horizontal or vertical direction of FIG. 3 are most seriously affected. In the vertical and horizontal intra prediction modes (mode numbers 0 and 1), one pixel is used to generate a prediction pixel of a prediction block, and thus the vertical and horizontal intra prediction modes are slightly affected.

For this reason, a filter (smoothing filter) is applied to the reference pixels in the directional intra prediction modes 3, 6 and 9, and is not applied to the reference pixels in the vertical and horizontal intra prediction modes. In the DC mode, the filter is not applied either. For these modes, whether or not to apply the filter may be determined regardless of a size of the current prediction unit.

In directional intra prediction modes existing between the intra prediction mode 3, 6 or 9 and the horizontal or vertical intra prediction mode, the filter can be adaptively applied to reference pixels according to the size of the prediction unit. It is preferable to increase a probability of applying the filter as the direction of the directional intra prediction mode is relatively closer to the direction of the intra prediction mode having the direction of 45°. Specifically, when a first directional intra prediction mode is closer in directivity to the intra prediction mode having the direction of 45° than a second directional intra prediction mode, if a filter is applied to the reference pixels in the second directional intra prediction mode, the filter is also applied to the reference pixels in the first directional intra prediction mode. On the other hand, if the filter is applied to the reference pixels in the first directional intra prediction mode, the filter may or may not be applied to the reference pixels in the second directional intra prediction mode.

There is a high possibility that a change in difference between pixels in a prediction unit of a large size will be less than a change in difference between pixels in a prediction unit of a small size. Thus, the number of directional modes in which the filter is applied may be increase or the stronger filter may be applied as the size of the prediction unit increases. On the other hand, when a prediction unit becomes smaller than a specific size, the filter may not be applied.

For one example, in the intra prediction mode 3, 6 or 9, a first filter may be applied to reference pixels of a prediction unit having a size equal to or smaller than a first size, and a second filter that is stronger than the first filter may be applied to reference pixels of a prediction unit having a size larger than the first size. The first size may vary according to directional prediction modes.

For another example, in the intra prediction mode 5 existing between the vertical intra prediction mode and the intra prediction mode 6, no filter may be applied to a prediction unit having a size equal to or smaller than a second size, the first filter may be applied to reference pixels of a prediction unit having a size larger than the second size and equal to or smaller than a third size, and the second filter may be applied to a prediction unit having a size larger than the third size. The second size and the third size may vary according to directional prediction modes.

The first filter may be a 3-tap filter [1, 2, 1] or a 5-tap filter [1, 2, 4, 2, 1]. The second filter has a greater smoothing effect than the first filter.

The prediction block generator 250 generates a prediction block according to the intra prediction mode of the current prediction unit received from the prediction mode decoder 230. A method of generating the prediction block is the same as that of the prediction block generator 142 in the intra predictor 150 of FIG. 2.

Specifically, in the directional intra prediction mode, the corresponding reference pixels vary according to the intra prediction modes. For example, in the vertical mode, the L upper reference pixels positioned at (x=0, . . . , and L−1, y=−1) are used, and in the horizontal mode, L left reference pixels positioned at (x=−1, y=0, . . . , and L−1) are used.

In non-directional intra prediction modes, the corner pixel, the L upper reference pixels positioned at (x=0, . . . , and L−1, y=−1) and the L left reference pixels positioned at (x=−1, y=0, . . . , and L−1) are used. The non-directional intra prediction modes are the DC mode and the planar mode.

In the planar mode, a reference pixel of a prediction block is generated using the corner reference pixel, a left reference pixel and an upper reference pixel. When a reference pixel to be generated is positioned at (a, b), a prediction pixel X(a, b) is generated using the corner reference pixel C(x=−1, y=−1), an upper reference pixel T(x=a, y=−1) and a left reference pixel L(x=−1, y=b). Specifically, X(a, b)=L(x=−1, y=b)+T(x=a, y=−1)−C(x=−1, y=−1).

In the intra prediction mode existing to the right side of the vertical mode of FIG. 3, a possibility that a difference between pixel of a lower left region of the generated prediction block and corresponding pixel of the original prediction unit will increase if the prediction block is generated using only upper reference pixels. However, when a prediction block is generated using upper reference pixels and left reference pixels, the difference can be reduced. This effect is greatest in the intra prediction mode 6. Also in intra prediction modes existing under the horizontal mode of FIG. 3, same method may be applied, and the effect is greatest in the intra prediction mode 9.

Thus, in the prediction mode 6 or 9, a prediction pixel may be generated using one upper interpolation reference pixel and one left interpolation reference pixel. The prediction pixel may be generated by linear interpolation of the one upper interpolation reference pixel and the one left interpolation reference pixel or using an average that is rounded off. Likewise, in a predetermined number of intra prediction modes adjacent to mode 6 or 9, a prediction block can be generated using the left reference pixels and the upper reference pixels. In this case, to reduce complexity, the aforementioned method may not be applied in intra prediction modes having mode numbers greater than a predetermined mode number (e.g., 9 or 17). Also, the method may be applied to only a current prediction unit having a size equal to or larger than a predetermined size. The predetermined size is 8×8 or 16×16.

The prediction block filter 260 adaptively filters the prediction block generated by the prediction block generator 250 according to the intra prediction mode of the current prediction unit received from the prediction mode decoder 230. The prediction block filter 260 may be integrated into the prediction block generator 250. A prediction block filtering method is the same as that of the prediction block post-processor 144 of the intra predictor 150 of FIG. 2.

Specifically, to reduce a difference in picture value between a reference pixel and a prediction pixel adjacent to the reference pixel, the prediction block filter 260 adaptively filters some or all prediction pixels adjacent to the reference pixels not used to generate the prediction block according to the intra prediction mode.

In the planar mode, the prediction pixels are generated using all reference pixel adjacent to the prediction pixel, and thus no filter is applied.

In the DC mode, an average of reference pixels is used to generate prediction pixel, and thus a filter is applied. Different type of filter can be used according to the size of prediction unit. In a prediction unit of a large size, a filter that is the same as used in a prediction unit of a small size or a strong filter having a great smoothing effect can be used.

The image reconstructor 270 receives a prediction block from the prediction block generator 250 or the prediction block filter 260 in units of prediction units according to the intra prediction mode. The image reconstructor 270 receives a residual signal restored by the residual signal decoder 220 in units of prediction units. The image reconstructor 270 generates a reconstructed image by adding the received prediction block and residual signal of a size of prediction unit. The image may be reconstructed in units of coding units. While the invention has been shown and described with reference to certain exemplary embodiments thereof, it will be understood by those skilled in the art that various changes in form and details may be made therein without departing from the spirit and scope of the invention as defined by the appended claims.

The invention claimed is:

1. An apparatus for decoding an image, the apparatus comprising:
   an entropy decoder configured to restore quantized residual coefficients and intra prediction information;
   a prediction mode decoder configured to restore an intra prediction mode based on the intra prediction information;
   a residual signal decoder configured to convert the quantized residual coefficients into a residual block;
   a reference pixel generator configured to generate reference pixels when one or more unavailable reference pixels exist, and to adaptively filter the reference pixels according to the intra prediction mode and a size of a prediction block;

a prediction block generator configured to generate the prediction block using reference pixels determined by the intra prediction mode; and an image constructor configured to generate a reconstructed image using the prediction block and the residual block, wherein the reference pixel generator adaptively filters the reference pixels according to the size of the prediction block for intra prediction modes existing between a horizontal mode and an intra prediction mode having a direction of 45° with reference to the horizontal mode, wherein, when the reference pixel generator filters the reference pixels for a second directional intra prediction mode, the reference pixel generator also filters the reference pixels for a first directional intra prediction mode that is closer to the intra prediction mode having the direction of 45° with reference to the horizontal mode than the second directional intra prediction mode is, wherein the second and the first directional intra prediction modes exist between the horizontal mode and the intra prediction mode having the direction of 45° with reference to the horizontal mode, and wherein the number of intra prediction modes in which the filter is applied increases as the size of the prediction block increases.

2. The apparatus of claim 1, wherein the reference pixel generator does not filter the reference pixels when the size of the prediction block is smaller than a predetermined block size.

3. The apparatus of claim 1, wherein, when the intra prediction mode is a planar mode, the prediction block generator generates the prediction block using a corner reference pixel, a left reference pixel and an upper reference pixel.

* * * * *